Patented June 23, 1931

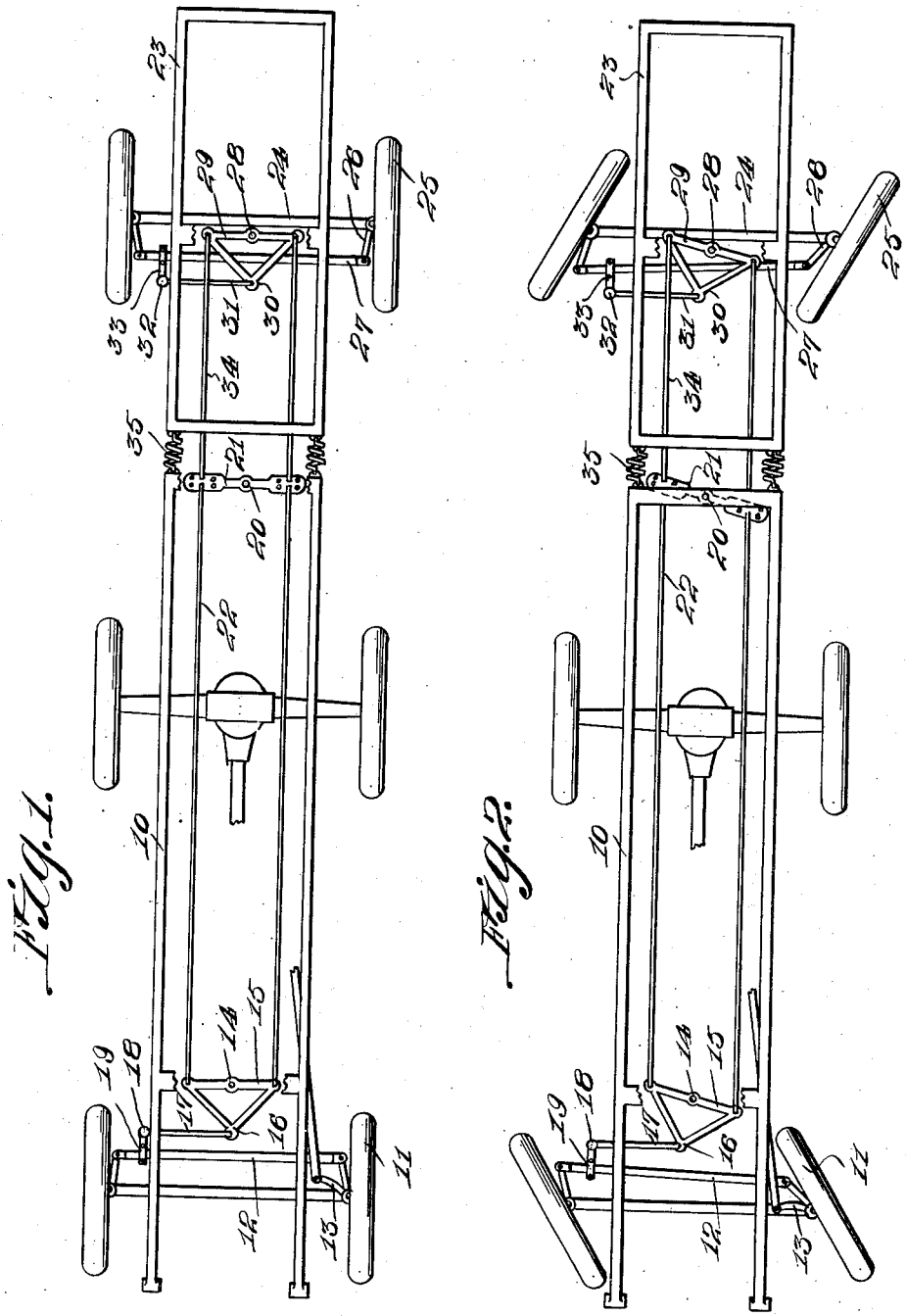

1,811,798

UNITED STATES PATENT OFFICE

ADAM J. LUCKE, OF GOODING, IDAHO

AUTOMOBILE TRAILER

Application filed December 26, 1928. Serial No. 328,530.

This invention relates to improvements in trailers and to controlling means for the latter whereby the direction of travel of the trailer in both its forward and rearward movement may be controlled.

An object of the invention is to provide means whereby the wheels of a trailer will be controlled by the steering mechanism of a towing vehicle, so that the direction of movement of the trailer may be controlled in backing, while forward turns may also be controlled.

Another object of the invention is the provision of means for connecting the towing vehicle and trailer and to yieldingly connect said vehicle and trailer upon opposite sides of their longitudinal center to eliminate wiggle and side sway.

With the above and other objects in view, the invention further includes the following novel features and details of construction, to be hereinafter more fully described, illustrated in the accompanying drawings and pointed out in the appended claim.

In the drawings:—

Figure 1 is a plan view showing a portion of the chassis of a towing vehicle and trailer and illustrating the invention, parts being broken away.

Figure 2 is a similar view illustrating the manner of controlling the wheels of the trailer.

Referring to the drawings in detail wherein like characters of reference denote corresponding parts, the reference character 10 indicates the chassis of a towing vehicle which includes the usual front wheels 11 and rod 12 which connects the steering knuckle arms 13 of the wheels 11. This mechanism may be of the usual character and forms a part of the ordinary steering mechanism of the towing vehicle.

Pivotally mounted as shown at 14 at the forward end of the towing vehicle is a lever 15. This lever may be triangular shaped as shown and has pivotally connected thereto as shown at 16, one end of a rod 17. The opposite end of this rod is pivotally connected as shown at 18 to an arm 19 which is clamped or otherwise suitably secured to the steering knuckle connecting rod 12.

Pivotally secured at the rear of the towing vehicle 10 as shown at 20 is a coupling lever 21 and connecting this lever upon opposite sides of its pivot 20 with the lever 15 upon opposite sides of the pivot 14 are connecting rods 22. Thus, when the vehicle is steered and the lever 15 moved pivotally by reason of its connection with the steering knuckle connecting rod 12, the lever 21 will be likewise moved pivotally.

The trailer, whose chassis is indicated at 23 has pivotally mounted at opposite ends of its axle 24, supporting wheels 25. These wheels are connected to the axle 24 by means of steering knuckles, after the manner of the mounting of the wheels 11 and these steering knuckles are provided with arms 26 which are connected by a steering knuckle connecting rod 27. The wheels 24 will thus move pivotaly after the manner of the wheels 11.

Pivotally mounted as shown at 28 upon the trailer 23 is a lever 29 which may be also triangular shaped and which has pivotally connected thereto as shown at 30, one end of a rod 31. The opposite end of this rod is pivotaly connected as shown at 32 to an arm 33 which is clamped or otherwise secured to the rod 27. Rods 34 connect the levers 21 and 29 upon opposite sides of their pivots 20 and 28 respectively.

It will be apparent from the foregoing description and accompanying drawings that when the wheels 11 are operated to steer the towing vehicle, the wheels 25 will be likewise operated so as to follow the direction of travel of the towing vehicle wheels. In addition, both the towing vehicle and trailer may be backed and the direction of movement accurately controlled by the steering mechanism of the towing vehicle.

The chassis or frames of the towing vehicle and trailer are connected by means of springs 35. These springs form shock absorbers to eliminate shock due to relative movement between the towing vehicle and trailer and in addition, provide a yielding connection between said towing vehicle and trailer so as to eliminate wiggle and side sway of the latter which is especially noticeable when travelling over rough or uneven roads.

The invention is susceptible of various changes in its form, proportions and minor details of construction and the right is herein reserved to make such changes as properly fall within the scope of the appended claim.

Having described the invention what is claimed is:

In a trailer of the class described, the combination with the chassis frame of a tractor vehicle, the front wheels thereof, and a connecting rod extending between the wheels, of a triangular rock lever mounted, intermediate the ends of one of its sides, in the frame for transverse swinging movement, an arm upon the connecting rod, a rod connecting the said arm and the forward corner of said lever, a bar rock lever pivotally mounted between its ends at the rear end of the chassis frame, rods connecting the other corners of the triangular rock lever and the ends of the bar rock lever, a trailer comprising a chassis frame, an axle, wheels mounted for turning adjustment at the ends of the axle, a rod extending between the wheels, a triangular rock lever mounted, intermediate the ends of one of its sides, in the frame, an arm upon the rod, a rod connecting the arm and the forward corner of the said lever, rods connecting the other corners of the said lever and the ends of the rock lever, and coiled springs connected to and extending between the corresponding rear and front ends of the tractor chassis and trailer chassis frames.

In testimony whereof I affix my signature.

ADAM J. LUCKE.